United States Patent Office 2,932,283
Patented Apr. 12, 1960

2,932,283

POWER-OPERATED STEERING MECHANISM FOR ROAD VEHICLES

Harold Jeffery, Lincoln, England, assignor to Clayton Dewandre Company Limited, Lincoln, England, a British company Application December 26, 1956, Serial No. 630,549

Claims priority, application Great Britain, January 4, 1956

8 Claims. (Cl. 121—41)

This invention relates to power steering mechanisms for road vehicles and has particular reference to mechanisms of the kind comprising a power cylinder which is adapted to be interposed between the drop arm of a vehicle's steering box, or its equivalent, and the drag link or some other movable component of the steering assembly, and which is operated by pressure developed in a constant-flow hydraulic circuit under the control of a valve actuated by the drop arm. The piston in the power cylinder is anchored to a fixed point on the vehicle, such as the frame, and the cylinder itself is movable to actuate the drag link or other movable steering component. The hydraulic circuit includes a pump and a reservoir, and the valve, which is attached to the power cylinder, is interposed between the pump and the reservoir and is operable to interrupt the flow in the circuit so that the pump builds up pressure therein, and to direct this pressure to one side or the other of the piston in the cylinder. Liquid displaced from the cylinder due to the resulting movement thereof is directed by the valve back to the reservoir.

The object of the present invention is to provide a power steering mechanism of the above kind with an improved control valve which is more positive in its operation than the valves hitherto employed in such mechanisms, and which when mounted on the end of the power cylinder, as is a common practice in mechanisms of this kind, makes a considerable reduction in the overall length of the mechanism.

According to the invention a power steering mechanism of the kind referred to has a control valve which comprises two face-type double-acting valve elements each disposed between two axially opposed annular valve seats and movable axially into engagement with one or the other thereof, said valve seats being arranged to provide passage for the flow of liquid from the pump to the reservoir and communication between both sides of the power piston and the pump and reservoir, and said valve elements being operable by means of a common actuator to interrupt said flow and cut off one side of the piston from the pump and maintain it in communication with the reservoir and cut off the other side of the piston from the reservoir and maintain it in communication with the pump.

Reference will now be made to the accompanying drawings in which.

Figure 1:
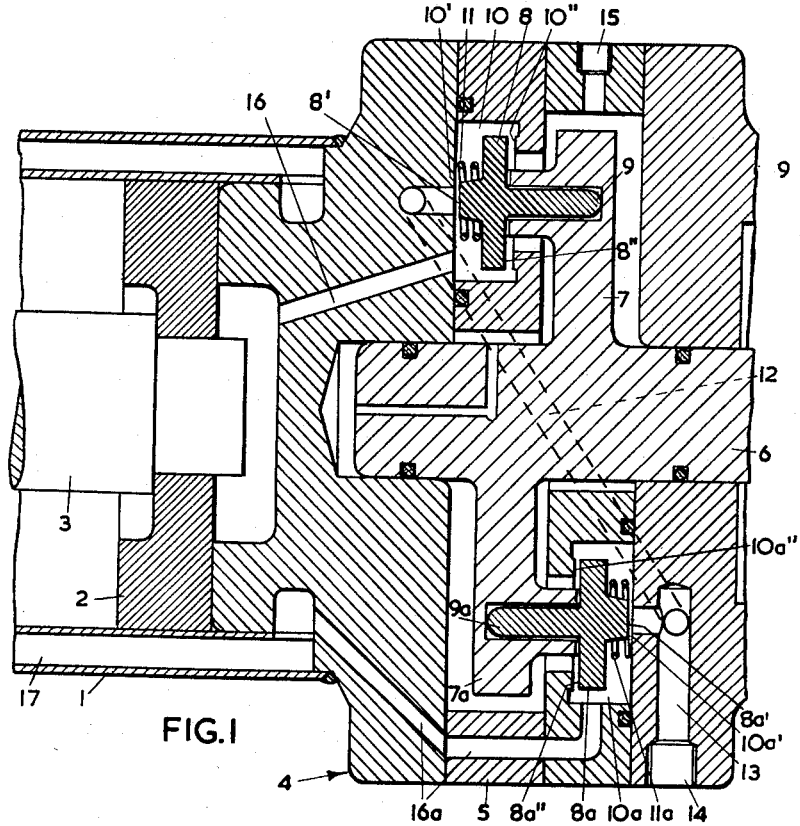
Fig. 1 is a sectional elevation of one embodiment of the invention.

In both embodiments the power steering mechanism has a double-acting power cylinder 1, containing a piston 2 whose rod 3 extends through one end of the cylinder and is adapted to be anchored to the frame of the vehicle at a convenient point so that the cylinder is free to move in either direction under the action of hydraulic pressure admitted to one side or the other of the piston. The control valve of the mechanism, indicated generally by the numeral 4, is mounted on the other end of the power cylinder and has a cylindrical casing 5 fixed co-axially thereto. On its side remote from the cylinder the valve casing is adapted to be connected with the drag link or other movable component of the steering assembly through the intermediary of a ball joint (not shown). Mounted concentrically in the valve casing so as to be slidable axially thereof is a spindle 6 which extends through the wall of the casing 5 remote from the power cylinder and is adapted to be connected with the drop arm of the steering box, or its equivalent, also through the intermediary of a ball joint (not shown). In the embodiment shown in Fig. 1 the spindle is formed inside the valve casing with two radial arms 7 and 7a which project from opposite sides of the spindle and are offset from one another axially of the spindle. In the outer ends of these arms two double-acting valve elements 8 and 8a of the poppet type are supported, the stems 9 and 9a of the two valve elements being slidably guided in the arms at right-angles thereto so that the valve elements are movable parallel to the spindle. Each valve element is located on that side of its supporting arm to which the arm supporting the other valve element is offset. This arrangement considerably reduces the axial dimension of the control valve and thus the overall length of the power unit. The heads of the valve elements 8 and 8a are respectively located in two valve chambers 10 and 10a in the valve casing. The chamber 10 is formed with two axially opposed annular valve seats 10′ and 10″ between which the head of the valve element 8 is co-axially disposed, and the chamber 10a with two similar valve seats 10a′ and 10a″ between which the head of the valve element 8a is co-axially disposed. The valve seats 10′ and 10a′ are smaller in diameter than the seats 10″ and 10a″. The heads of the valve elements 8 and 8a are formed with flat valve faces 8′ and 8a′ respectively for engagement with the smaller valve seats 10′ and 10a′, and annular valve faces 8″ and 8a″ respectively for engagement with the larger valve seats 10″ and 10a″. The valve faces 8′ and 8a′ can be conical or spherical instead of flat. The valve elements are urged away from the smaller valve seats and towards the larger ones by coil springs 11 and 11a mounted in the valve chambers 10 and 10a, and are normally held off the larger seats by the arms 7 and 7a of the spindle 6. Through the smaller valve seats 10′ and 10a′ and passages 12 and 13 in the valve casing the two valve chambers communicate with an inlet 14 that is adapted to be connected with the outlet of the pump in the hydraulic circuit, and through the larger valve seats 10″ and 10a″ and the interior of the casing the valve chambers communicate with an outlet 15 that is adapted to be connected with the reservoir in the circuit. The valve chamber 10 also communicates with the adjacent end of the power cylinder via a passage 16 in the valve casing, and the chamber 10a with the far end of the cylinder via a passage 16a in the valve casing and through the wall of the cylinder, which wall is made hollow for this purpose as shown at 17.

When the control valve is in the neutral condition, as shown in Fig. 1, the two valve elements 8 and 8a are completely unseated, that is, each of them is disengaged from both of its valve seats, and the liquid in the hydraulic circuit flows freely from the pump to the reservoir via the inlet 14 in the valve casing, the smaller valve seats 10′ and 10a′, the valve chambers 10 and 10a, the larger valve seats 10″ and 10a″, the interior of the valve casing and the outlet 15 therein. In this condition the valve elements maintain both ends of the power cylinder in communication with the pump and the reservoir and the cylinder remains at rest.

When the steering wheel is rotated the spindle 6 carrying the valve elements is moved axially by the drop arm in one direction or the other according to the direction of rotation of the steering wheel. This movement of the spindle allows one of the valve elements to be moved by its spring onto the larger of its two seats so as to cut off one end of the power cylinder from the reservoir but leave it in communication with the pump through the smaller of said seats. The other valve element is moved by the spindle onto the smaller of its two seats so as to cut off the other end of the power cylinder from the pump but leave it in communication with the reservoir through the larger of said seats. This also interrupts the flow of liquid from the pump to the reservoir, and the resultant pressure built up by the pump is admitted to the power cylinder through the end thereof that is still in communication with the pump. As the piston in the power cylinder is fixed, the cylinder itself is moved by this pressure and actuates the drag link accordingly. Liquid displaced by the cylinder due to the movement thereof returns to the reservoir through the valve casing. If the steering wheel is held stationary after an initial degree of angular movement, the spindle and the valve elements will be held stationary also and the valve casing, moving with the power cylinder, will overtake the valve elements with the result that the latter will be restored to their neutral positions wherein they are completely unseated. The free circulation of the liquid in the hydraulic circuit will thereby be resumed until the steering wheel is again rotated to cause a further actuation of the valve elements. Thus, the power-steering mechanism has a "follow-up" action which gives progressive control of the steering.

During the operation of the mechanism the pressure acting on the power cylinder also acts on the valve element which is seated on the larger of its two seats and cutting off the pressure space in the cylinder from the reservoir. The pressure acts on this valve element in a direction to hold it on its seat and thereby imparts a positive actuation to said valve element. The other valve element, which is seated on the smaller of its two seats to interrupt the flow of liquid from the pump to the reservoir, has the pressure reacting against it and tending to return it to its neutral position. This reaction, which is proportional to the pressure acting on the power cylinder, is transmitted back through the spindle 6 to the steering wheel and gives the driver a "feel" of the power-assistance being applied to the steering. In order to balance the reaction so as to hold said valve element on its seat an increased manual effort must be applied to the steering wheel. Thus the power output is at all times proportional to the manual input and increases progressively with it.

Figure 2:
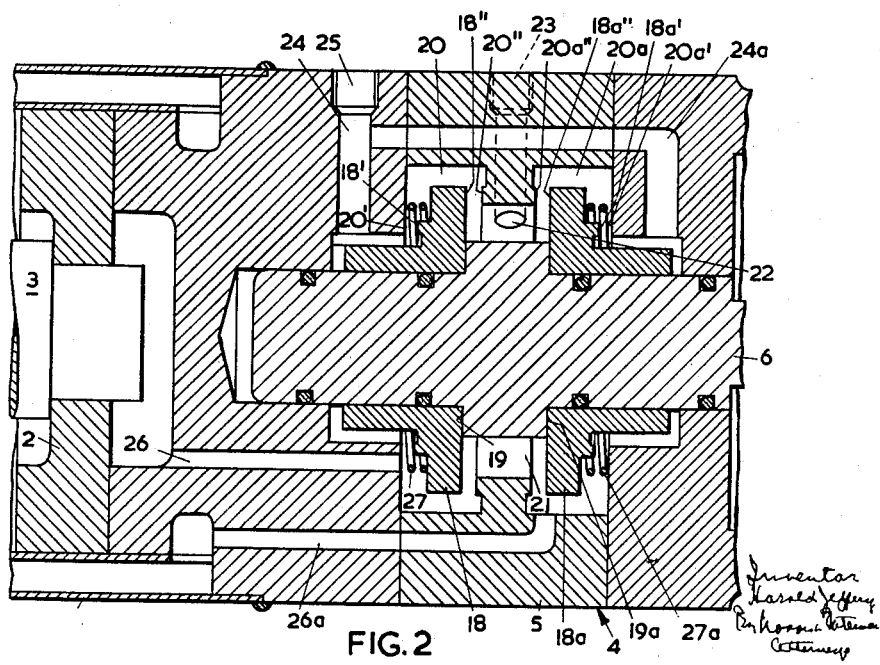
Fig. 2 is a sectional elevation of an alternative embodiment.

In an alternative form of the invention shown in Fig. 2 two valve elements 18 and 18a of annular form are slidably mounted on the spindle 6 concentrically therewith, the spindle being constructed without the radial arms 7 and 7a described earlier herein. Intermediate its ends the spindle is enlarged to form two axially spaced shoulders 19 and 19a, and the two valve elements are arranged to abut these shoulders. The valve elements 18 and 18a are respectively located in two co-axial valve chambers 20 and 20a through which the spindle 6 passes. The chamber 20 is formed with two axially opposed annular valve seats 20' and 20" between which the valve element 18 is co-axially disposed, and the chamber 20a with two similar valve seats 20a' and 20a" between which the valve element 18a is co-axially disposed. The valve seats 20' and 20a' are smaller in diameter than the seats 20" and 20a". The larger seats are arranged at the adjacent ends of the two valve chambers, and between them is formed an annular space 21. A passage 22 leads from this space through the valve casing to an outlet 23 therein that is adapted to be connected with the reservoir. The valve chambers thus communicate with the reservoir through the larger valve seats 20" and 20a", the annular space 21, the passage 22 and the outlet 23. They communicate with the pump through the smaller valve seats 20' and 20a', passages 24 and 24a in the valve casing, and an inlet that is adapted to be connected with the pump. The valve chamber 20 also communicates with the adjacent end of the power cylinder via a passage 26 in the valve casing, and the chamber 20a with the far end of the cylinder via a passage 26a in the valve casing and through the hollow wall of the cylinder. The valve element 18 is formed with two annular valve faces 18' and 18" for engagement with the valve seats 20' and 20" respectively, and the valve element 18a with two similar valve faces 18a' and 18a" for engagement with the seats 20a' and 20a" respectively. The valve elements are urged away from the smaller valve seats 20' and 20a' and towards the larger ones 20" and 20a" by coil springs 27 and 27a mounted in the chambers 20 and 20a, and are normally held off the larger seats by the shoulders 19 and 19a on the spindle 6, which shoulders are spaced further apart than the two larger valve seats. This determines the neutral positions of the valve elements wherein they are completely unseated.

In operation, this alternative form of the invention is similar to the form shown in Fig. 1, the axial movement of the spindle 6 in either direction being operable, through the shoulders on the spindle, to allow one of the valve elements to be moved by its spring-loading onto the larger of its two seats, and bring the other valve element into engagement with the smaller of its two seats.

The form of control valve shown in Fig. 2 is inclined to be more sensitive in its operation that that shown in Fig. 1, since in the former the force reacting through the spindle 6 against the manual input effort is applied to the spindle concentrically thereof, whereas in the form shown in Fig. 1 this force is applied eccentrically of the spindle through one or the other of the radial arms 7 and 7a thereon, and consequently has a slight tendency to bind the spindle in the valve casing.

I claim:

1. A power steering mechanism of the kind referred to having a movable power piston and a control valve with fluid pressure inlet and exhaust ports, which comprises a first face-type double-acting valve element disposed between first and second axially opposed annular valve seats and movable axially into engagement with one or the other thereof, and a second face-type double-acting valve element disposed between first and second axially opposed annular valve seats and movable axially into engagement with one or the other thereof, said valve seats being arranged to provide passage for the flow of liquid from the inlet to the exhaust port and communication between both sides of the power piston and the inlet and exhaust ports, and said valve elements being operable by means of a common actuator to interrupt said flow and cut off one side of the piston from the inlet port and maintain it in communication with the exhaust port and cut off the other side of the piston from the exhaust port and maintain it in communication with the inlet port, at least one of said valve elements being capable of being restored to unseated neutral position independently of the other of said valve elements.

2. A power steering mechanism of the kind referred to having a movable power piston and a control valve including a casing fixed to the power cylinder for movement therewith and formed with fluid pressure inlet and exhaust ports, a first valve chamber, a first face-type double-acting valve element in said chamber disposed between first and second axially opposed annular valve seats formed in said chamber and movable axially into engagement with one or the other thereof, a second valve chamber, and a second face-type double-acting valve element in said second chamber disposed between first and second axially opposed annular valve seats formed in said second chamber and movable axially into engagement with one or the other thereof, said valve chambers being in permanent communication one with each end of the power cylinder and communicating through the two first valve seats with said inlet port and through the two second valve seats with said exhaust port, and said valve elements being independently mounted for relative movement, and a common actuator for said valve elements for moving said valve elements from their unseated positions, one of said valve elements being movable by said actuator into engagement with said first valve seat associated therewith and the other of said valve elements being movable by said actuator means into said second valve seat associated therewith.

3. A power steering mechanism according to claim 2, wherein said valve elements are spring-loaded towards said second valve seats but are normally held off them by said common actuator, and wherein said actuator is movable in opposite directions in said casing and is operable in one direction to move said first valve element into engagement with the corresponding first valve seat and allow said second valve element to be moved by its spring-loading into engagement with the corresponding second valve seat, and in the other direction to move said second valve element into engagement with the corresponding first valve seat and allow said first valve element to be moved by its spring-loading into engagement with the corresponding second valve seat.

4. A power steering mechanism according to claim 3, wherein each valve element has first and second valve faces formed on opposite sides thereof for engagement with the corresponding first and second valve seats respectively.

5. A power steering mechanism according to claim 4, wherein said valve elements are carried by a spindle which is axially slidable in said casing and constitutes said common actuator.

6. A power steering mechanism according to claim 5, wherein said valve elements are of the poppet type and are carried one on each of two arms extending radially from said spindle, each valve element having a head located in the corresponding valve chamber and on which are formed the first and second valve faces of that valve element, and a stem which extends through the corresponding second valve seat and is slidably mounted parallel to the axis of said spindle in the corresponding arm thereon, the heads of the valve elements being disposed on opposite sides of said arms in the direction of said axis.

7. A power steering mechanism according to claim 6, wherein said arms are offset from one another axially of said spindle, and wherein the head of each valve element is disposed on that side of the corresponding arm to which the other arm is offset.

8. A power steering mechanism according to claim 5, wherein said valve elements are of annular form and are slidably mounted on said spindle concentrically therewith, and wherein the valve seats for said valve elements are all co-axial and said spindle passes concentrically through them, the spindle having two axially spaced annular shoulders each abutted by one of said valve elements under its spring-loading.

References Cited in the file of this patent
UNITED STATES PATENTS

| | | |
|---|---|---|
| 1,921,092 | Newton | Aug. 8, 1933 |
| 2,005,971 | Edwards | June 25, 1935 |
| 2,376,804 | Orshansky | May 22, 1945 |
| 2,786,454 | Bertsch | Mar. 26, 1957 |
| 2,796,851 | Ziskal | June 25, 1957 |